United States Patent [19]

Jackson et al.

[11] 4,103,067

[45] Jul. 25, 1978

[54] LOW HYDROGEN WELDING ELECTRODES

[76] Inventors: Clarence E. Jackson, 866 Mission Hills La., Worthington, Ohio 43085; Albert A. Freeman, 17015 Hillview La., Spring, Tex. 77373

[21] Appl. No.: 744,602

[22] Filed: Nov. 24, 1976

Related U.S. Application Data

[63] Continuation-in-part of Ser. No. 646,930, Jan. 6, 1976, abandoned, which is a continuation of Ser. No. 535,822, Dec. 23, 1974, abandoned.

[51] Int. Cl.$^2$ .................................... B23K 35/365
[52] U.S. Cl. .................... 428/387; 148/23; 148/24; 148/25; 219/137 WM; 219/145.23
[58] Field of Search ............. 219/146, 73, 137 WM; 148/23–25; 228/224, 263; 428/387

[56] References Cited

U.S. PATENT DOCUMENTS

| | | | |
|---|---|---|---|
| 2,052,400 | 8/1936 | Moritz et al. | 148/25 |
| 2,432,773 | 12/1947 | Lee | 219/8 |
| 2,435,504 | 2/1948 | Mathias | 219/8 |
| 3,078,193 | 2/1963 | Jackson | 148/26 |
| 3,428,497 | 2/1969 | Coless | 148/23 |
| 3,513,289 | 5/1970 | Blake et al. | 219/146 |
| 3,573,426 | 4/1971 | Blake et al. | 219/148 |
| 3,688,967 | 9/1972 | Arikawa | 148/23 X |
| 3,701,444 | 10/1972 | Clement et al. | 219/146 |
| 3,760,146 | 9/1973 | Rozet | 219/146 |
| 3,767,888 | 10/1973 | Sullivan | 219/146 |
| 3,769,491 | 10/1973 | DeLong et al. | 219/146 X |
| 3,944,776 | 3/1976 | Tsuboi et al. | 219/146 X |
| 4,010,304 | 3/1977 | Petersen | 219/146 X |

OTHER PUBLICATIONS

Semenova, O. P., Comptes Rendus (Doklady) de l'Academie des Sciences de l'URSS. 1946, vol. L1, #9, pp. 683–686.

Pashcenko, A. A. et al., Avt. Svarka. 1967, #4, pp. 62–64.

Jackson, C. E. The Science of Arc Welding, Union Carbide Publication, 12-68 5M 88-1028 F-52-501. 1968.

*Primary Examiner*—Richard E. Schafer
*Attorney, Agent, or Firm*—William E. Jackson

[57] ABSTRACT

An improved welding electrode for producing weld metal having low amounts of hydrogen therein so that hydrogen-assisted cracking in the weld zone is minimized. This is especially beneficial for welding high strength steels having tensile strengths of about 70,000 psi and above. The electrode has a filler wire core and a flux covering of predetermined constituents and low moisture levels such as below about 0.6 percent. The flux is bound together with a binder of hydrolyzed organic silicate (silica) which makes no substantial contribution to the moisture level of the covering and which also makes the covering resistant to hygroscopic moisture pickup before the electrode is used for welding. Thus, this binder minimizes the amount of hydrogen from any moisture in the covering which may be introduced into the weld metal during welding. Additionally, the flux covering contains a source of barium or cesium in an amount effective to reduce the slag/metal reaction temperature during welding. By so reducing this temperature, the amount of hydrogen actually introduced into the weld metal from the electrode covering and binder is minimized. This reduction of the slag/metal reaction temperature during welding has been found to have the additional advantage of reducing the amount of oxygen in the weld metal. This provides increased impact properties for the weld metal.

17 Claims, 1 Drawing Figure

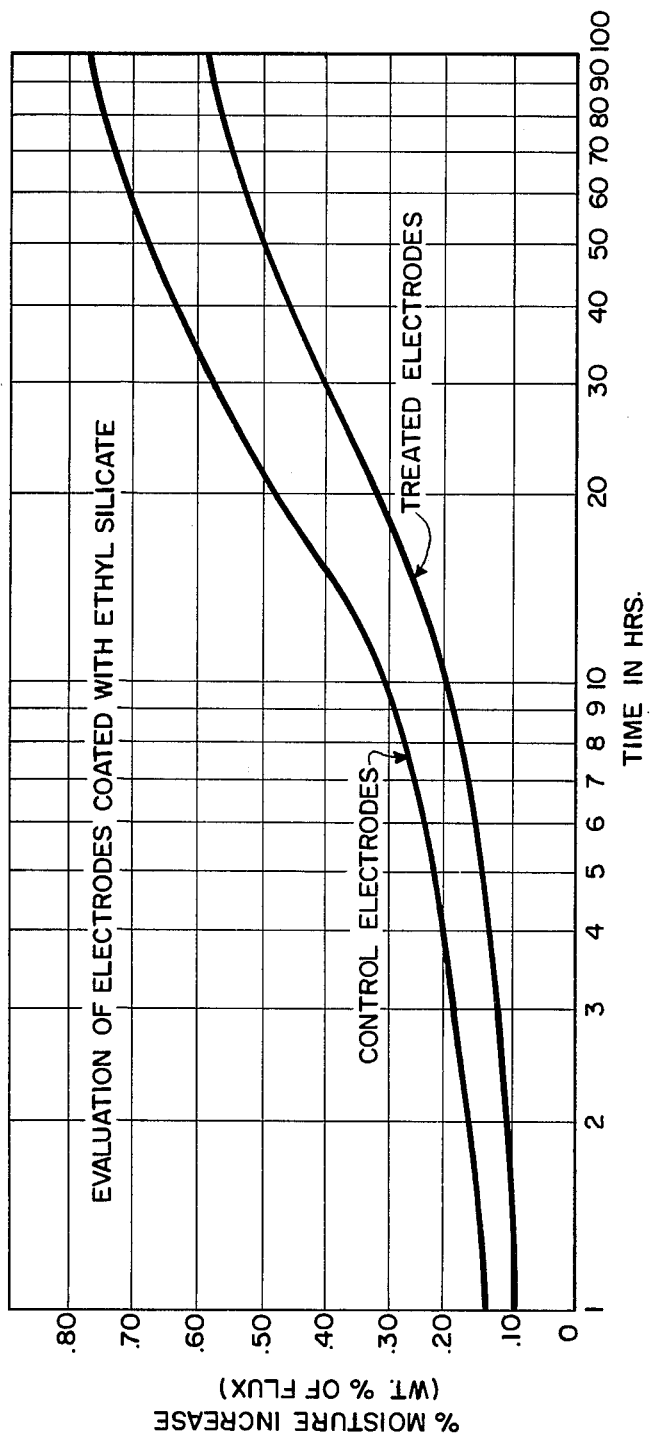

LOW HYDROGEN WELDING ELECTRODES

CROSS-REFERENCES TO RELATED APPLICATIONS

The present application is a continuation-in-part of applicants' copending application Ser. No. 646,930, filed Jan. 6, 1976, which is a continuation of applicants' application Ser. No. 535,822, filed Dec. 23, 1974, both abandoned.

BACKGROUND OF THE INVENTION

This invention relates to arc welding electrodes for producing weld metal having low amounts of hydrogen therein. More particularly, this invention relates to an improvement for so-called "low hydrogen" electrodes. In the improvement the flux coating contains a source of barium or cesium and the coating is bound together by a hydrolyzed organic silicate binder. The combination of the barium or cesium and the binder reduce the amount of hydrogen introduced into the weld metal. Additionally, the amount of oxygen found in weld metal of high strength steels is reduced.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core. Examples of such flux compositions are set forth in detail in the patents to Lee, U.S. Pat. No. 2,432,773, and Mathias, U.S. Pat. No. 2,435,504.

Binders are used in such fluxes and in electrode coatings to hold the coating together and to maintain the desired shape of the electrode coating about the metallic core during normal handling. In general, the binders which are most predominantly used in the prior art are either sodium silicate or potassium silicate. Such binders have been particularly useful because they do not decompose under conditions of use and because they provide adequate strength characteristics in the quantity added to the flux composition for the high rate of extrusion used in the manufacture of such electrodes. In addition, the specific properties of either potassium silicate or sodium silicate makes each attractive for the manufacture of welding electrodes. For example, the drying characteristics are such that the liquid silicates used in welding electrodes as binders become hard films through the loss of water. By way of a specific example, one grade of sodium silicate with a ratio of $SiO_2/Na_2O$ of 3.22 has a water content of 62.4 percent and a viscosity of ⅓ poises at 20° C. The viscosity rises to 72 poises with a 6 percent weight loss by evaporation and to over 9000 poises with a 12 percent weight reduction of the original weight. When the evaporation totals about 14 percent of the original weight, the viscosity is about 40,000 poises and at this point the silicate, for practical purposes, has set. Further dehydration brings the silicate to a rigid condition.

The amount of moisture retained by the silicate film is governed primarily by the temperature to which it is subjected. It is known that room temperature air-drying of the silicate is not adequate for films or bonds that are to be used in welding. In some of the formulations known to the prior art for covered electrodes, materials are added which react with the silicate at high temperatures. For example, kaolin or other minerals which decompose by heat may restrict treatments to less than about 260° C (about 500° F).

The sodium and potassium silicates have been particularly useful because their properties provide characteristics which are essential in the manufacture of covered electrodes. In general, the practical approach to the use of silicate binders has been to determine the grade which is best suited for the manufacturing operation and to control the quality of the covered electrode by maintaining the properties of the binders. With the addition of liquid sodium silicate to a dry powder formulation, the resulting dough can be kneaded to a consistency that is appropriate for subsequent extrusion. The mass of kneaded dough is formed into "slugs" which facilitates handling during the time of storage and loading of presses for the extrusion operation. At present, a substantial portion of commercially produced coated electrodes for mild steel are produced by the extrusion process.

The plasticity of the coating batch is controlled somewhat by the silicate addition but may also be influenced by other plastic ingredients such as raw clay or bentonite which may be added or combined with non-plastic ingredients such as silica or calcined clay. As the electrodes are extruded, the electrode becomes reasonably solid and resists flattening as soon as the electrodes leave the die and fall on a conveyor belt. Drying is carried out at a low temperature beginning at about 100°–150° C (about 200°–300° F) with controlled humidity in order to obtain uniform drying of the coating without cracking. This drying step is followed by one or more higher temperature drying steps at a lower humidity depending upon the nature of the covering. The moisture content of the completed coating of the electrode will range from less than 0.1 percent in some low hydrogen electrode types to as high as 3 to 6 percent in a cellulose type of electrode. In electrodes of the high cellulose type (for example, of the class normally referred to in the art as E6010 and E6011) which produce ductile weld metal with a minimum of 60,000 pounds per square inch tensile strength, the use of water silicate binders can be particularly appropriate since the product may contain 3 to 4 percent moisture.

However, in higher strength, low hydrogen type electrodes these binders have not been satisfactory for at least several reasons. First, the drying of low hydrogen electrodes requires a high temperature treatment in order to drive off as much of the moisture as is necessary to meet the applicable specification. Second, the maintenance of this degree of dryness has been important in the welding of higher strength materials and such maintenance necessitates careful handling to avoid hygroscopic moisture pickup during the shop use of these electrodes. Although moisture pickup has not been particularly troublesome in coatings for lower strength weld metal, the hygroscopic characteristics of the present day low hydrogen coatings has made it mandatory to use heated ovens to maintain the dryness and restrict the pick up of moisture. In higher strengths, the hygroscopic nature of the coatings has been particularly damaging since, for example, in the EXXX18 type of electrodes, the moisture content must be kept at a level below 0.2 percent. Production facilities for producing such electrodes have the capability of reducing the moisture content to a level of less than 0.1 percent and in some cases to less than 0.05 percent.

For a low hydrogen flux composition having predetermined flux components (for example, those of the Lee and Mathias patents mentioned above) the sodium silicates and potassium silicates used as binders usually make up about 10 percent of the weight of the flux for any given electrode. When DC electrical power is used, the sodium silicate binder is used for a number of reasons. For example, the stability of the arc is not a significant problem with direct current. The sodium silicate is not quite as hygroscopic as potassium silicate and sodium silicate will dry to a lower moisture content than the potassium silicate. Thus, sodium silicates have been widely selected for low hydrogen electrodes. On the other hand, potassium silicate is normally selected when the electrode is used with an AC power source.

Because of the rigid moisture control required for low hydrogen electrodes, it has been a significant problem to many fabricators to prevent an excessive hygroscopic pickup of moisture on low hydrogen electrodes. By way of an example of the scope of the problem, it has been said that on a hot humid day, on the order of 90° F at 90 percent relative humidity in a shipyard, an exposed low hydrogen electrode will pick up enough moisture in about twenty minutes to exceed military specification standards. Thus, a close control must be maintained over the use and storage of low hydrogen electrodes.

A number of articles have been written and studies conducted on the storage and control of low hydrogen electrodes. At least one investigator has determined that the low hydrogen electrodes could not be successfully rebaked at low temperatures so that the consensus derived from the work of many investigators is that the most appropriate way to avoid hydrogen absorption by the weld metal is to keep the moisture content of the electrode coating to a minimum in the first instance. As a result, stringent controls have been placed on the moisture levels of the low hydrogen electrode. For example, the specified maximum moisture content of low hydrogen electrodes varies from a high of 0.6 percent $H_2O$ for E60 or E7018 electrodes to a low of 0.1 percent $H_2O$ for an E14018 type. These values ae quite low when compared to other electrodes such as the EXX10 or the EXX11 series which may contain over 5 percent $H_2O$. For purposes of this disclosure, and in keeping with the art, "moisture level" or content is the percent, by weight, of $H_2O$ in the flux coating.

It is thus clear that the lowering of the moisture level has created significant problems both for the manufacturer and the consumer in order to take extra precautions with the low hydrogen electrodes to insure that their moisture content does not rise above the required maximum levels.

Such precautions have included the steps of holding the electrodes at elevated temperatures to protect them from moisture absorption and rebaking the electrodes to recondition the electrode coating if the moisture content rises above the recommended level. Some electrode manufacturers even specify that the electrodes should be held in the oven at approximately 300° F until they are used and that if the electrodes are allowed to reach moisture levels which are too high, most manufacturers recommend that the electrodes be rebaked for one hour at about 700° F to about 750° F.

The redrying temperature depends on the composition and thickness of the covering. Coverings which contain organic material are usually redried at temperatures below the charring point (for example, about 250° F) whereas inorganic coverings, such as the low hydrogen types, are redried at temperatures up to 850° F. It has been important in the art to follow precisely the drying procedures prescribed by the manufacturer for specific electrodes; otherwise, the electrodes may become unusable. For example, specified oven temperatures must be maintained after drying and electrodes should not be removed from holding ovens for more than several hours before being used; otherwise, redrying may be required.

The moisture content of low hydrogen coverings, for example, of the E7015, E7016, E7018 and E7028 electrodes should be kept below 0.4 percent for the former two and less than 0.6 percent moisture content for the latter. Preferably, the moisture content should be maintained below 0.3 percent. If the moisture content is significantly above these values, underbead cracking is likely and other undesirable effects may result. The criticality of monitoring and maintaining the moisture content of low hydrogen electrodes is underscored by the observation that a safe practice, followed by many fabricators, is to return all unused low hydrogen electrodes after either a two hour exposure or a working shift to a redrying oven maintained at 250°–350° F for at least eight hours before reissuing them for use. Studies have shown that significant amounts of moisture are absorbed by the coverings on low hydrogen electrodes exposed for various periods of time.

While the undesired presence of hydrogen in weld metal for high strength steels has been of concern to the welding art, another source of concern is the undesired presence of oxygen. As pointed out by Heuschkel in *The Welding Journal*, 46 (2), pp. 74-s to 93-s (1967), the presence of oxygen of about 0.050% has an adverse effect on the impact properties of weld metal. Thus, it is desirable to reduce oxygen content to a value of less than about 0.030% in the weld metal of high strength steels.

Applicants acknowledge that ethyl silicate, barium and cesium are mentioned in the prior art of arc welding. See U.S. Pat. No. 2,052,400 to Moritz et al; U.S. Pat. No. 3,078,193 To C. E. Jackson; Pashchenko et al, *Automatic Welding*, pp. 62–62, April 1967; Hummitsch, *Schweisstechnik*, pp. 84–89, July 1948; C. E. Jackson, *The Welding Journal*, April-June 1960. However, none of this prior art teaches the improved combination of the present invention.

In view of the above background, it is an overall object of the present invention to provide an improvement in low hydrogen arc welding electrodes.

Another object of the present invention is to provide an improvement in such electrodes which are used for welding high strength steels.

Further, an object of the present invention is to minimize the amount of hydrogen introduced into weld metal from the flux covering and binder of an arc welding electrode.

Still further, an object of the present invention is to minimize the amount of oxygen introduced into weld metal for high strength steels.

These and other objects and aims of this invention will become apparent from a study of the written description of the invention.

BRIEF SUMMARY OF THE INVENTION

According to an aspect of the present invention, we provide an improved arc welding electrode for producing weld metal having low amounts of hydrogen therein so that hydrogen cracking of the weld is minimized. The improved electrode has a filler wire core and a flux covering thereon of predetermined constituents. One of the predetermined constituents of the flux covering is a source of barium or cesium and the flux covering has a moisture level of less than 0.6 percent. The constituents of the flux covering are bound together by a binder of hydrolyzed organic silicate (such as ethyl silicate) which makes no substantial contribution to the moisture level and which makes the covering resistant to hygroscopic moisture pickup prior to welding. The barium or cesium are present in the flux covering in an amount effective to reduce the slag/metal reaction temperature during welding. This reduction in temperature minimizes the amount of hydrogen introduced into the weld metal from the flux covering and binder. In another aspect of the present invention, we provide an improved arc welding electrode for producing weld metal having low amounts of hydrogen and oxygen therein so that, respectively, hydrogen cracking is minimized and impact properties are improved. The invention is particularly beneficial for high strength low hydrogen electrodes used for welding steels having tensile strengths of about 140,000 psi.

Experimental data indicates that a hydrolyzed ethyl silicate binder will reduce the hygroscopicity of a commercial electrode flux covering by some 46%. The data also indicates that cesium or barium will reduce the oxygen content of the weld metal by some 46% for cesium and some 30% for barium. The drawing shows the reduction of hygroscopicity of electrodes coated with hydrolyzed ethyl silicate.

DETAILED DESCRIPTION OF THE INVENTION

By way of specific embodiment, an electrode with which the invention may be used, as is well known in the art, comprises a metallic core coated with a flux composition. Typical examples of flux composition with which the teachings of this invention may be used are disclosed in U.S. Pat. Nos. 2,435,504 and 2,432,773. By way of generalized description of the types of compounds with which this invention may be practiced, the following composition ranges of coatings for low hydrogen covered electrodes are representative, but not restrictive:

| Composition Ranges of Coatings for Low-Hydrogen Covered Electrodes, %. Source: Rolnick, J.M., "Covered-Electrode Coating Formulation Study", Air Reduction Sales Company, P&EDD-64-240, Nov. 16, 1964 | | | |
|---|---|---|---|
| | EXX15 | EXX16 | EXX18 |
| Calcium Carbonate (CaCO$_3$) | 10/30 | 10/30 | 10/30 |
| Fluorspar (CaF$_2$) | 10/30 | 10/30 | 10/30 |
| Titanium Dioxide (TiO$_2$) | 0/8 | 15/30 | 0/8 |
| Iron Powder (Fe) | 0/5 | 0/5 | 15/30 |
| Ferro Alloys (Fe—Mn, Fe—Si) | 15/30 | 15/30 | 15/30 |
| Mineral Silicates | 5/10 | 5/10 | 5/10 |
| Sodium and/or Potassium Silicate | 5/15 | 5/15 | 5/15 |
| Composition Ranges of Constituents of Coverings on Mild Steel Arc Welding Electrodes, %. Source: ASM Metals Handbook, 8th Edition, Vol 6, P.6 (1971) | | | |
| | E7016 | | E7018 |
| Calcium Carbonate | 15/30 | | 15/30 |
| Fluorspar | 15/30 | | 15/30 |
| Titanium Dioxide | 15/30 | | 0/5 |
| Iron Powder | 0 | | 25/40 |
| Ferrosilicon | 5/10 | | 5/10 |
| Ferromanganese | 2/6 | | 2/6 |
| Feldspar | 0/5 | | 0/5 |
| Sodium silicate | 0/5 | | 0/5 |
| Potassium silicate | 5/10 | | 5/10 |

Because the principles of this invention are apparent without specific discussion of the other components of the flux composition, detailed disclosure of such compositions is not believed to be necessary in view of the aforementioned patents and generalized description of the types of compounds mentioned above by way of example. As is apparent, the low hydrogen electrodes of the type with which the invention is particularly suited are made up from a flux composition which consists of predetermined flux components plus a binder. Thus, the present invention resides in the modification of the flux constituents by the addition of a constituent as a source of barium or cesium and the use of a hydrolyzed organic silicate binder such as ethyl silicate, either as a replacement or a supplement for the sodium silicate or potassium silicate known to the art.

By utilizing the principles of the invention with one of the foregoing generalized examples, the following coating composition is representative: Calcium Carbonate 15–30%; Fluorspar 15–30%; Titanium Dioxide 0–5%; Iron Powder 25–40%; Ferrosilicon 5–10%; Ferromanganese 2–6%; Feldspar 0–5%; Ethyl silicate As desired; Barium Carbonate or Pollucite in an effective amount.

In order to modify a commercial electrode having predetermined flux components plus a binder, a source of barium or cesium is added to the coating. A preferred material is barium carbonate, BaCO$_3$, which compound has several advantages over some of the other compounds which might have been selected. For example, barium carbonate will supply some gas shielding to the arc atmosphere and at a lower temperature than calcium carbonate. Second, barium has a lower thermionic work function. Third, even though barium has approximately the same first ionization potential as sodium, it has a second ionization potential that is 1/5 that of sodium. Fourth, barium carbonate is relatively inexpensive and readily available. A suitable source of cesium is Pollucite which has been reported to have an analysis of CsAlSi$_2$O$_6$ in the *Handbook of Chemistry and Physics*, 47th Ed. 1966-67, by the Chemical Rubber Co.

In order to attach the barium carbonate to the existing electrode, the material to be used had to be a good bonding agent that dried without increasing the hydrogen potential of the electrode and that dried at relatively low temperature. Accordingly, an organic silicate and, preferably, ethyl silicate, was selected. Commercially, there are three types of ethyl silicates readily available, i.e. tetraethyl ortho-silicate, ethyl silicate 40, and condensed ethyl silicate. In order to use ethyl silicate as a binder, the ethyl silicate must be hydrolyzed. In a hydrolyzed condition, ethyl silicate decomposes and the organic part of ethyl silicate evaporates and leaves a hard silica film. The decomposition of ethyl silicate is controlled by the amount of hydrochloric acid that is used in the hydrolyzed solution. The solvent that is used in a hydrolyzed solution is either ethyl or methyl alcohol. The method for hydrolyzing ethyl silicate is according to manufacturer's instructions.

By replacing or supplementing sodium silicate or potassium silicate of a known flux composition with hydrolyzed ethyl silicate, with proper drying, the hydrolyzed ethyl silicate converts to silica with no moisture which results in a lower moisture content for the flux. It is within the scope of the invention to replace all or part of the potassium or sodium silicate with ethyl silicate, although optimum results are expected when only ethyl silicate is used. Such use further simplifies the handling and use of covered electrodes by permitting a longer maintenance in shop atmosphere without picking up the damaging moisture since the silica binder is resistant to hygroscopic moisture pickup. By way of specific example, the coating of an E14018 electrode with hydrolyzed silica and redrying the material in an inert gas protected atmosphere at 1000° F should reduce the moisture content to a level which is satisfactory for this product. Further, the pickup of moisture is restricted so that these electrodes may be used for longer periods than ordinary shop practice without excess pick up of moisture.

By way of specific example of the amount of barium carbonate to be added to the composition to achieve the desired results, it is anticipated that a range of about 0.1 percent by weight to about 5 percent by weight will be an effective amount. A similar range would be involved in the use of Pollucite.

The electrode improvements according to the present invention involve (1) the use of hydrolyzed organic silicate binder for the electrode flux coating to reduce and maintain a low potential hydrogen content in the flux, and (2) the use of barium and cesium compounds to provide a lower slag/metal temperature. The binder creates a low hydrogen potential because hydrolyzed organic silicate is silica which, unlike sodium or potassium silicate, does not have water of crystalization or chemically bound water. Further, silica is more resistant to moisture pickup than sodium or potassium silicate. Since the weld metal from the improved electrode is formed at lower temperatures than the prior art, any available hydrogen will have a reduced tendency to be introduced into the weld metal. The reduced temperature also inhibits the introduction of oxygen into the weld metal.

While the actions of a welding arc are complex and depend on many factors, we believe that there is a theoretical explanation for the effect of lower arc temperatures. First, as the temperature is reduced, the disassociation of any water ($2H_2O = 2H_2 + O_2$) that may be in the arc atmosphere will decrease. Second, it has been suggested that a water-gas reaction ($CO + H_2O = CO_2 + H_2$) governs the amount of hydrogen that the weld metal absorbs. Mallet, M. W., *The Welding Journal*, 25, pp. 396s–399s, 1946. If the temperature of the arc is lowered, the mass action constant, $K_w$, of the reaction $CO + H_2O = CO_2 + H_2$ will move the equilibrium point more to the left hand side of the equation and, thus, reduce the free hydrogen available to be absorbed in the weld metal. We also believe that there is a theoretical explanation for the use of barium and cesium to produce a lower arc temperature. K. K. Khrenov (Avtogennoe Delo, 8, 14–15, Aug., 1949) and O. P. Semenova (Acad. Sci. L'URSS Compt. rend, 51, 683–686, 1946) have reported that the temperature in the arc is related to the ionization potential of the constituents in the arc. Khrenov has suggested that the temperature (degrees K) of the arc is equal to 800 $V_e$ where $V_e$ is the average effective ionization potential. Since barium or cesium would provide low ionization potentials, they are expected to produce a low temperature.

Since the invention may be embodied in other forms, the disclosed embodiments may be considered as illustrative and not restricted. The scope of the invention is indicated by the claims.

EXAMPLES

Control Electrodes

Experiments were performed to establish the characteristics of the EXXX18 type of electrode in the as-received condition. All of the weld tests were made as soon as possible after the electrode container had been opened. The flux samples were taken immediately after the containers were opened. The flux samples were placed in a paper envelope and stored in a desiccator in the preparation for the determination of the moisture content. After the coating samples were stored, all the test welds were made.

The commercial mild steel test plates were 6 × 12 × 0.5 inches in size; as many as six welds beads were placed on each plate. In any given series of weld tests, the plates were allowed to cool to room temperature before the next weld was made.

Three different types of EXXX18 electrodes were used in this experiment. They are:

1. E7018-A1. This is an Atom Arc (A Division of Chemetron Corporation) electrode which is recommended for steels containing 0.50 percent molybdenum. The outside diameter of the flux coating was 0.250 inch and coating made up 33 percent of the weight of an electrode. The core wire size was 5/32 inch. The typical chemical analysis of the weld metal is 0.05 percent C, 0.75 percent Mn, 0.56 percent Si, and 0.53 percent Mo.

2. E9018-B3. This was also an Atom Arc electrode which is recommended for use with 2¼ chromium-moly steels. The outside diameter of the flux coating was 0.250 inch and the coating made up 30 percent of the weight of an electrode. The core wire size was 5/32 inch. The typical chemical analysis of the weld metal is 0.05 percent C, 0.75 percent Mn, 0.65 percent Si, 2.20 percent Cr, and 1.05 percent Mo.

3. E11018-M. This was a McKay electrode (manufactured by Teledyne McKay), which is recommended for use with low alloy high strength steels in the 100,000 psi tensile strength range. The outside diameter of the flux coating was 0.250 inch and the coating made up 30 percent of the weight of an electrode. The core wire size was 5/32 inch. The typical chemical analysis of the weld deposit is 0.05 percent C, 1.60 percent Mn, 0.40 percent Si, 1.60 percent Ni and 0.40 percent Mo.

In the flat welding position the recommended current range for a 5/32 inch EXX18 electrode is 130 to 220 amp. Therefore, bead-on-plate welds were made with each electrode at 130, 170, and 220 amp. These welds were made so that the melting rate could be compared at different current levels. The results are shown in Table I.

Test weld beads were made to determine the effect of moisture in the flux coating on the welding arc. The current used to make all of these welds was the optimum value recommended by the manufacturer, 170 amp. The voltage used was also the one recommended by the manufacturer, 24 volts.

All of the electrodes were redried before any moisture was added. It was necessary to determine the moisture content of the electrodes after they had been redried at 750° F for one hour and before control welds were made. The average moisture value after a one hour rebake was found to vary from 0.38 to 0.42 percent with an average of 0.4 percent.

SPECIFIC EXAMPLES

By way of specific examples, four E7018 electrodes were coated with a mixture of hydrolyzed ethyl silicate and barium carbonate. The mixture consists of 200 ml. of hydrolyzed ethyl silicate and 4.5 grams of barium carbonate. Approximately 50 percent of the barium carbonate went into solution. Consequently, the solution had to be agitated vigorously as the electrodes were dipped in the liquid. The electrodes remained in the solution for 20 seconds. After the electrodes were dried, test welds were made using the electrodes. The current was the only welding parameter that was changed during the four tests.

The first batch of electrodes that were coated with hydrolyzed ethyl silicate showed a high degree of water repellency. The treated electrodes showed an average moisture increase of 1.3 percent in 87.5 hours, see Table II in the Appendix, whereas, the control electrodes showed an average increase of 2.25 percent in just 67.5 hours. This amounted to a reduction of 46 percent in the hygroscopicity of the electrodes of the invention compared to the control electrodes.

The results from the $BaCO_3$ coated electrodes can be seen in Tables III and IV. The performance of $BaCO_3$ electrode was excellent and the optimum current setting increased by 20 amperes (170 to 190 amps). This phenomenon has a definite advantage. If the electrode can still produce a quality weld, the melting rate and penetration should increase. The reason for this is that in shielded metal-arc welding, the current is the most influential parameter, when it comes to controlling the melting rate and the depth of penetration.

From the graph in the drawing, it can be seen that the results that were received reduced the hygroscopicity from 0.3 to 0.2 percent at 10 hours. Even at 1 hour exposure, the increase in moisture was decidedly lower for the treated electrode. It must be remembered that the hydrolyzed solution contained only 10 percent silica and this may be an important factor.

The indications are that hydrolyzed ethyl silicate will produce a film on an electrode coating which reduces the hygroscopicity of the flux coating. In this experiment, the moisture absorption level was reduced from 0.78 percent to 0.59 percent moisture with an exposure time of 116 hours. The practical importance is the reduction of moisture increase from 0.23 to 0.14 percent in 5 hours. The addition of $BaCO_3$ to the flux coating of a low hydrogen electrode increases the optimum current setting of the electrode. This, in turn, increases the melting rate and penetration of the electrode.

TABLE I

WELDING PARAMETERS

| Run No. | Amperage (± 2 Amp) | Voltage* (± 1 Volt) | Travel Speed(S) (in/min) | Size of Electrode (in) | Moisture Content (% Wt. of Flux) | Type of Electrode |
|---|---|---|---|---|---|---|
| 1 | 130 | 24 | 8.0 | 5/32 | 0.47 | E11018-M |
| 2 | 130 | 24 | 8.0 | 5/32 | 0.52 | E7018-A1 |
| 3 | 130 | 24 | 8.0 | 5/32 | 0.60 | E9018-B3 |
| 4 | 170 | 24 | 7.35 | 5/32 | 0.47 | E11018-M |
| 5 | 175 | 24 | 7.52 | 5/32 | 0.52 | E7018-A1 |
| 6 | 170 | 24 | 7.7 | 5/32 | 0.60 | E9018-B3 |
| 7 | 220 | 24 | 7.25 | 5/32 | 0.47 | E11018-M |
| 8 | 220 | 24 | 7.5 | 5/32 | 0.52 | E7018-A1 |
| 9 | 220 | 24 | 7.55 | 5/32 | 0.60 | E9018-B3 |

*Electrode Positive Direct Current.

TABLE II

| Time (Hr.) | % Moisture Increase Treated Electrodes | | | | % Moisture Increase Control Electrodes | | | |
|---|---|---|---|---|---|---|---|---|
| | #1 | #2 | #3 | #4 | #5 | #6 | #7 | #8 |
| 3.5 | | | | | .18 | .19 | .23 | .20 |
| 16.5 | .33 | .31 | .28 | .27 | | | | |
| 67.5 | | | | | 2.1 | 2.1 | 2.4 | 2.4 |
| 87.5 | 1.2 | 1.2 | 1.4 | 1.5 | | | | |
| Run 2 | #9 | #10 | #11 | #12 | #13 | #14 | #15 | #16 |
| 1 | .1 | .1 | .9 | .08 | .14 | .14 | .14 | .13 |
| 3 | .14 | .13 | .11 | .11 | .20 | .20 | .19 | .19 |
| 5 | .17 | .14 | .13 | .13 | .23 | .23 | .23 | .23 |
| 7 | .19 | .16 | .15 | .15 | .25 | .25 | .26 | .25 |
| 20 | .33 | .33 | .30 | .32 | .47 | .48 | .46 | .48 |
| 44 | .47 | .51 | .45 | .48 | .67 | .67 | .65 | .67 |
| 116 | .59 | .63 | .56 | .61 | .78 | .78 | .76 | .78 |

Note:
Average silica added to flux coating equaled .0818 grams. This equaled .47 per cent of the flux (by weight).

TABLE III

WELDING PARAMETERS

| Run No. | Amperage (± 2 Amp) | Voltage (± 1 Volt) | Travel Speed(S) (in/min) | Moisture Content (% Wt. of Flux) (± 0.07%) | Type of Electrode |
|---|---|---|---|---|---|
| 50 | 175 | 25 | 8.12 | 0.4 | E7018-A1 |
| 51 | 170 | 25 | 8.12 | 0.4 | E7018-A1 |
| 52 | 183 | 25 | 7.75 | 0.4 | E7018-A1 |
| 53 | 192 | 25 | 8.5 | 0.4 | E7018-A1 |

TABLE IV

CALCULATED DATA

| Run No. | Melting Rate (lbs/min) (± 5.0%) |
|---|---|
| 50 | 0.049 |
| 51 | 0.048 |
| 52 | 0.049 |
| 53 | 0.052 |

The following experiments demonstrate the effect of the present invention in reducing the oxygen content of weld metal for high strength steel. Oxygen contents of 500ppm with commercial E14018 electrodes were reduced to as low as 250ppm with Pollucite and 270ppm with $BaCO_3$. In this investigation, the following commercial covered electrodes were used:

| | | | | | |
|---|---|---|---|---|---|
| McKay E-14018 | 5/32" | Lot # | 1129898 | Heat # | 422C7721 |
| McKay E-11018-M | 5/32" | " | 21425 | " | BN0068 |
| Airco E-12018 | 3/16" | " | 043B16 | | — |
| Airco E-12018-M1 | 1/8" | " | 043B16 | | — |
| Chemtron E-8018-C3 | 3/32" | " | 504735-2S | " | 03L048 |
| ESAB E-8018-C1 | 3/32" | " | 509037 | | — |

According to the manufacturer's information, the weld metal for the E-14018 electrode has the following analysis (%):

| | |
|---|---|
| C— .044 | Sulfur— .006 |
| Manganese— .89 | Chromium— .45 |
| Si— .27 | Nickel— 3.43 |
| Phosphorus— .005 | Molybdenum— .73 |
| | Fe— balance |
| Vanadium .010 | Covering moisture— .048 |

All electrodes were baked at 750° F for one hour prior to any treatment or use. Electrodes were stored in a holding oven at 325° F. The electrodes listed above were used in one of two conditions, namely treated and untreated in accordance with the teachings of the present invention. For electrode treatment, a solution of hydrolyzed ethyl silicate was prepared. To this solution either Pollucite or barium carbonate was added. The formulation of this was as follows:

340.2 ml- ethyl silicate
531.0 ml- methyl alcohol
31.5 ml Conc. HCl (37%)

This was stirred vigorously for 20 minutes. At that time, 20.25 grams of $BaCO_3$ or Pollucite was added. The Pollucite was in rock form and had to be crushed and sized to pass 200 mesh before it could be added to the solution of hydrolyzed ethyl silicate.

Electrodes were removed from the holding oven (325° F) and dipped in the agitated solution for 20 seconds, removed, and placed back in the holding oven to dry and set up. The allowance for drying or set up time was always greater than 8 hours.

A double dip was performed on one batch of electrodes. For this part of the experiment, the electrodes were allowed to cure or set up for approximately one hour after the first dip. They were then subjected to a second dip for twenty seconds and then placed back in the holding oven (325° F) for eight hours before they were used.

Chemical Analysis Pads

To determine the oxygen content in weld metal of the covered electrodes listed above, a chemical pad were prepared in each case. This pad was prepared according to AWS A5.5-69, Section 20. Multilayers of beads were deposited on the 6x4x1 inch plates used for the test. A side beam automatic welding unit (Westinghouse Weldomatic) was used to deposit the beads on pads 1 through 6. Pads 7 through 18 were accomplished manually. In both cases, the same power supply was used (Hobart Cyber-Tig). In all test welds, direct current reverse polarity was used. Welding current for each electrode was the manufacturer's recommended optimum. Table V lists the current and voltage for each weld. Travel speed in all cases was maintained at approximately 4.25 millimeters per second. After the pads were welded, they were sectioned and sent to a commercial laboratory for analysis. (Bowser-Morner Laboratories, Dayton, Ohio).

Table V

Chemical Pads, SMAW, for All Weld Metal Analysis As Per AWS A5.5-69.

| Pad Design. | Electrode | Diameter (in) | Manufact. | Treatment | Current (amps) | Voltage (volts) | Oxygen Content* (ppm) | Electrode Performance |
|---|---|---|---|---|---|---|---|---|
| 1 | E14018 | 5/32 | McKay | None | 170 | 22 | 500 | Poor |
| 2 | E14018 | 5/32 | McKay | $BaCO_3$ | 170 | 22 | 360 | Fair |
| 3 | E14018 | 5/32 | McKay | Pollucite | 170 | 22 | 270 | Excellent |
| 4 | E14018 | 5/32 | McKay | $BaCO_3$ | 170 | 22 | 280 | Fair |
| 5 | E14018 | 5/32 | McKay | Pollucite | 170 | 22 | 250 | Excellent |
| 6 | E14018 | 5/32 | McKay | Ethyl Sil. Only | 170 | 22 | 260 | Fair |
| 7 | E14018 | 5/32 | McKay | None | 170 | 22 | 311 | Poor |
| 8 | E12018 | 3/16 | Airco | None | 240 | 23 | 486 | Good |
| 9 | E11018 | 5/32 | McKay | None | 170 | 23 | 348 | Good |
| 10 | E8018 | 3/32 | Chemetron | None | 100 | 24 | 408 | Good |
| 11 | E8018 | 3/32 | ESAB | None | 100 | 24 | 548 | Good |
| 12 | E8018 | 3/32 | Chemetron | Pollucite | 100 | 22 | 402 | Excellent |
| 13 | E8018 | 3/32 | ESAB | Pollucite | 100 | 22 | 505 | Excellent |
| 14 | E11018 | 5/32 | McKay | Pollucite | 170 | 22 | 377 | Excellent |
| 15 | E12018 | 3/16 | Airco | Pollucite | 240 | 23 | 499 | Excellent |
| 16 | E12018 | 1/8 | Airco | None | 142 | 23 | 458 | Good |
| 17 | E12018 | 1/8 | Airco | Pollucite | 142 | 23 | 470 | Excellent |
| 18 | E12018 | 1/8 | Airco | Pollucite Double | 142 | 23 | 488 | Excellent |

Note:
1. All welds made DCRP (electrode positive).
2. All travel speeds were approximately 10 in. per minute.
*Reported by Bowser-Morner Testing Laboratories.

We claim:

1. In an arc welding electrode for producing ferrous weld metal having low amounts of hydrogen therein so that hydrogen-assisted cracking is minimized, said electrode having a ferrous filler wire core and flux covering thereon of predetermined constituents, said flux covering having a moisture level of less than about 0.6 percent, the improvement comprising:

a binder of hydrolyzed organic silicate for binding said constituents together, said binder being characterized by the fact that it makes substantially no contribution to said moisture level and makes said flux covering resistant to hygroscopic moisture pickup before said electrode is used for welding, said binder thereby minimizing the amount of hydrogen from said flux covering which may be potentially introduced into said ferrous weld metal during welding, and one of said constituents being a source of barium, said barium being present in an amount from about 0.1% to about 5% by weight and being effective to reduce the slag/metal reaction temperature during welding, whereby the amount of hydrogen introduced into said ferrous weld metal from said flux covering and binder is minimized.

2. The invention of claim 1 wherein said organic silicate is ethyl silicate, the hydrolyzed form thereof being a hard silica.

3. The invention of claim 1 wherein one of said predetermined constituents is iron powder; the moisture level of said flux covering is less than about 0.1 percent; and said ferrous weld metal has a tensile strength of at least about 140,000 psi.

4. The invention of claim 1 wherein said last-named constituent is barium carbonate.

5. The invention of claim 4 wherein said barium carbonate is attached to the exterior of said electrode with said binder.

6. In an arc welding electrode for producing ferrous weld metal having low amounts of hydrogen therein so that hydrogen-assisted cracking is minimized, said electrode having a ferrous filler wire core and flux covering thereon of predetermined constituents, said flux covering having a moisture level of less than about 0.6 percent, the improvement comprising:
   a binder of hydrolyzed organic silicate for binding said constituents together, said binder being characterized by the fact that it makes substantially no contribution to said moisture level and makes said flux covering resistant to hygroscopic moisture pickup before said electrode is used for welding, said binder thereby minimizing the amount of hydrogen from said flux covering which may be potentially introduced into said ferrous weld metal during welding, and
   one of said constituents being a source of cesium, said cesium being present in an amount from about 0.1% to about 5% by weight and being effective to reduce the slag/metal reaction temperature during welding, whereby the amount of hydrogen introduced into said ferrous weld metal from said flux covering and binder is minimized.

7. The invention of claim 6 wherein said organic silicate is ethyl silicate, the hydrolyzed form thereof being a hard silica.

8. The invention of claim 6 wherein one of said predetermined constituents is iron powder; the moisture level of said flux covering is less than about 0.1 percent; and said ferrous weld metal has a tensile strength of at least about 140,000 psi.

9. The invention of claim 6 wherein said last-named constituent is a cesium compound.

10. The invention of claim 9 wherein said cesium compound is attached to the exterior of said electrode with said binder.

11. In an arc welding electrode for producing ferrous weld metal having low amounts of hydrogen and oxygen therein so that, respectively, hydrogen-assisted cracking is minimized and the adverse effect of oxygen on impact properties is minimized, said electrode having a filler wire core and flux covering thereon of predetermined constituents, said flux covering having a moisture level of less than about 0.6 percent, the improvement comprising:
   a binder of hydrolyzed organic silicate for binding said constituents together, said binder being characterized by the fact that it makes substantially no contribution to said moisture level and makes said flux covering resistant to hygroscopic moisture pickup before said electrode is used for welding, said binder thereby minimizing the amount of hydrogen from said flux covering which may be potentially introduced into said ferrous weld metal during welding, and
   one of said constituents being a source of barium, said barium being present in an amount from about 0.1% to about 5% by weight and being effective to reduce the slag/metal reaction temperature during welding, whereby the amount of hydrogen and oxygen introduced into said ferrous weld metal from said flux covering and binder is minimized.

12. The invention of claim 11 wherein said organic silicate is ethyl silicate, the hydrolyzed form thereof being a hard silica.

13. The invention of claim 11 wherein one of said predetermined constituents is iron powder; the moisture level of said flux covering is less than about 0.1 percent; and said ferrous weld metal has a tensile strength of at least about 140,000 psi.

14. The invention of claim 11 wherein said last-named constituent is barium carbonate.

15. In an arc welding electrode for producing ferrous weld metal having low amounts of hydrogen and oxygen therein so that, respectively, hydrogen-assisted cracking is minimized and the adverse effect of oxygen on impact properties is minimized, said electrode having a filler wire core and flux covering thereon of predetermined constituents, said flux covering having a moisture level of less than about 0.6 percent, the improvement comprising:
   a binder of hydrolyzed organic silicate for binding said constituents together, said binder being characterized by the fact that it makes substantially no contribution to said moisture level and makes said flux covering resistant to hygroscopic moisture pickup before said electrode is used for welding, said binder thereby minimizing the amount of hydrogen from said flux covering which may be potentially introduced into said ferrous weld metal during welding, and
   one of said constituents being a source of cesium, and cesium being present in an amount from about 0.1% to about 5% by weight and being effective to reduce the slag/metal reaction temperature during welding, whereby the amount of hydrogen and oxygen introduced into said ferrous weld metal from said flux covering and binder is minimized.

16. The invention of claim 15 wherein said organic silicate is ethyl silicate, the hydrolyzed form thereof being a hard silica.

17. The invention of claim 15 wherein one of said predetermined constituents is iron powder; the moisture level of said flux covering is less than about 0.1 percent; and said ferrous weld metal has a tensile strength of at least about 140,000 psi.

* * * * *